(12) United States Patent
Kodama et al.

(10) Patent No.: US 7,626,733 B2
(45) Date of Patent: Dec. 1, 2009

(54) IMAGE-PROCESSING APPARATUS, AN IMAGE-PROCESSING METHOD, A PROGRAM, AND A MEMORY MEDIUM

(75) Inventors: Taku Kodama, Kanagawa (JP); Takao Inoue, Kanagawa (JP); Ikuko Yamashiro, Kanagawa (JP); Keiichi Ikebe, Kanagawa (JP); Takashi Maki, Kanagawa (JP); Hiroyuki Sakuyama, Tokyo (JP); Takanori Yano, Kanagawa (JP); Akira Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1341 days.

(21) Appl. No.: 10/646,086

(22) Filed: Aug. 22, 2003

(65) Prior Publication Data

US 2004/0100654 A1 May 27, 2004

(30) Foreign Application Priority Data

Aug. 26, 2002 (JP) .............................. 2002-244530

(51) Int. Cl.
*H04N 1/00* (2006.01)

(52) U.S. Cl. .............................. 358/426.07; 358/426.02; 358/426.01; 358/400

(58) Field of Classification Search ............... 348/231.1, 348/231.99, 222.1, 207.99; 345/598, 597, 345/596, 589, 581, 418; 358/426.07, 426.02, 358/426.01, 400; 375/262, 261, 260, 259; 382/246, 244, 232, 239
See application file for complete search history.

(56) References Cited

U.S. PATENT DOCUMENTS

| 5,040,233 | A | * | 8/1991 | Davy et al. .................. 382/239 |
| 5,563,960 | A | | 10/1996 | Shaprio |
| 6,041,143 | A | | 3/2000 | Chui et al. |
| 6,137,595 | A | | 10/2000 | Sakuyama et al. |
| 6,215,916 | B1 | | 4/2001 | Acharya |
| 6,226,011 | B1 | | 5/2001 | Sakuyama et al. |
| 6,885,395 | B1 | * | 4/2005 | Rabbani et al. .......... 348/231.1 |

(Continued)

FOREIGN PATENT DOCUMENTS

EP 03005303.7-1247 8/2003

(Continued)

OTHER PUBLICATIONS

JPEG 2000 Part I Committee Draft Version 1.0, Coding of Still Pictures, ISO/IEC JTC1/SC29 WG1, Mar. 16, 2000, XP-001004858, pp. 1-190.

(Continued)

*Primary Examiner*—Houshang Safaipour
(74) *Attorney, Agent, or Firm*—Blakely, Sokoloff, Taylor & Zafman LLP

(57) ABSTRACT

Efficient utilization of a memory medium is enhanced in an image-processing apparatus, in which encoded data of JPEG 2000 or Motion-JPEG 2000 are stored in the memory medium as a file. File size of the encoded data is adjusted close to, but not to exceed an integer multiple of a memory domain management unit (sector size) of the memory medium. Thereby, a memory domain assigned to the image file in its entirety, or almost in its entirety, is used effectively, improving the efficient utilization of the memory medium.

27 Claims, 14 Drawing Sheets

U.S. PATENT DOCUMENTS

| | | |
|---|---|---|
| 2002/0039440 A1 | 4/2002 | Sakuyama |
| 2002/0159644 A1 | 10/2002 | Sakuyama |
| 2002/0196970 A1 | 12/2002 | Sano et al. |
| 2003/0002742 A1 | 1/2003 | Sano et al. |

FOREIGN PATENT DOCUMENTS

| | | |
|---|---|---|
| JP | 5012800 | 1/1993 |
| JP | 03219836 | 3/1993 |
| JP | 04173443 | 1/1994 |
| JP | 06044692 A | 2/1994 |
| JP | 06350989 A | 12/1994 |
| JP | 2000040142 A | 2/2000 |
| JP | 2000-125293 | 4/2000 |
| JP | 2000-125294 | 4/2000 |
| JP | 2001285642 A | 10/2001 |
| JP | 2002-152517 | 5/2002 |
| JP | 2002-152744 | 5/2002 |
| JP | 2002-344732 | 11/2002 |
| WO | WO 99/49412 | 9/1999 |

OTHER PUBLICATIONS

Joel Askelof et al., "Region of Interest Coding in JPEG 2000", Signal Processing: Image Communication, vol. 17, No. 1, Jan. 2002, pp. 105-111.

E. Nguyen et al., "A ROI Approach for Hybrid Image Sequence Coding", Proceedings of the International Conference on Image Processing (ICIP), Austin, Nov. 13-16, 1994, Los Alamitos, vol. 3, Conf. 1, pp. 245-249.

Hideyuki Tamura, "Introduction to Computer Image Processing", Soken Publishing, Ltd., 1985, 7 pages.

* cited by examiner

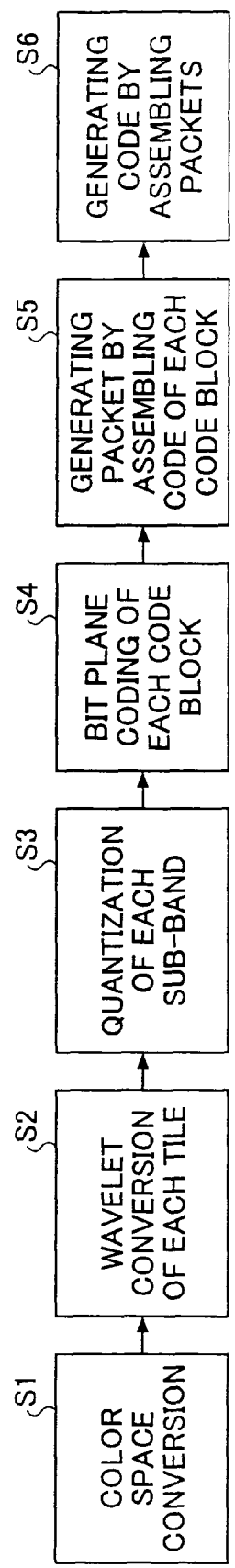

DECOMPOSITION LEVEL 0

DECOMPOSITION LEVEL 1

DECOMPOSITION LEVEL 2

DECOMPOSITION LEVEL 3

CODING FORMAT

FIG. 5

| SUB-BAND | 2LL | | | | 2HL | | | | 2LH | | | | 2HH | | | | IHL | | | | | | | |
|---|---|---|---|---|---|---|---|---|---|---|---|---|---|---|---|---|---|---|---|---|---|---|---|---|
| PRECINCT NO. | 0 | 1 | 2 | 3 | 0 | 1 | 2 | 3 | 0 | 1 | 2 | 3 | 0 | 1 | 2 | 3 | 0 | 1 | 2 | 3 | 4 | 5 | 6 | 7 | 8 |
| SUB-BIT PLANE | CLEANUP | | | | | | | | | | | | | | | | | | | | | | | | |
| BIT PLANE MSB | | | | | | | | | | | | | | | | | | | | | | | | | |
| CODE OF BIT 12 | 0 | 1 | 2 | 3 | 4 | 5 | 6 | 7 | 4 | 5 | 6 | 7 | 4 | 5 | 6 | 7 | 8 | 9 | 10 | 11 | 12 | 13 | 14 | 15 | 16 |
| CODE OF BIT 11 | | | | | | | | | | | | | | | | | | | | | | | | | |
| CODE OF BIT 10 | | 18 | 19 | 20 | 21 | 22 | 23 | 24 | 21 | 22 | 23 | 24 | 21 | 22 | 23 | 24 | 25 | 26 | 27 | 28 | 29 | 30 | 31 | 32 | 33 |
| CODE OF BIT 9 | 17 | 35 | 36 | 37 | 38 | 39 | 40 | 41 | 38 | 39 | 40 | 41 | 38 | 39 | 40 | 41 | 42 | 43 | 44 | 45 | 46 | 47 | 48 | 49 | 50 |
| | 34 | 52 | 53 | 54 | 55 | 56 | 57 | 58 | 55 | 56 | 57 | 58 | 55 | 56 | 57 | 58 | 59 | 60 | 61 | 62 | 63 | 64 | 65 | 66 | 67 |
| CODE OF BIT 8 | 51 | 69 | 70 | 71 | 72 | 73 | 74 | 75 | 72 | 73 | 74 | 75 | 72 | 73 | 74 | 75 | 76 | 77 | 78 | 79 | 80 | 81 | 82 | 83 | 84 |
| CODE OF BIT 7 | 68 | 86 | 87 | 88 | 89 | 90 | 91 | 92 | 89 | 90 | 91 | 92 | 89 | 90 | 91 | 92 | 93 | 94 | 95 | 96 | 97 | 98 | 99 | 100 | 101 |
| CODE OF BIT 6 | 85 | 103 | 104 | 105 | 106 | 107 | 108 | 109 | 106 | 107 | 108 | 109 | 106 | 107 | 108 | 109 | 110 | 111 | 112 | 113 | 114 | 115 | 116 | 117 | 118 |
| CODE OF BIT 5 | 102 | 120 | 121 | 122 | 123 | 124 | 125 | 126 | 123 | 124 | 125 | 126 | 123 | 124 | 125 | 126 | 127 | 128 | 129 | 130 | 131 | 132 | 133 | 134 | 135 |
| CODE OF BIT 4 | 119 | | | | | | | | | | | | | | | | | | | | | | | | |
| CODE OF BIT 3 | | | | | 136 | 137 | 138 | 139 | 136 | 137 | 138 | 139 | 136 | 137 | 138 | 139 | 140 | 141 | 142 | 143 | 144 | 145 | 146 | 147 | 148 |
| CODE OF BIT 2 | | | | | 149 | 150 | 151 | 152 | | | | | | | | | 153 | 154 | 155 | 156 | 157 | 158 | 159 | 160 | 161 |
| CODE OF BIT 1 | | | | | | | | | | | | | | | | | | | | | | | | | |

PACKETS

| LRCP PACKET 0 | PACKET 1 | PACKET 2 | PACKET 3 | PACKET 4 | PACKET 5 |
|---|---|---|---|---|---|
| LAYER···0 | LAYER···0 | LAYER···0 | LAYER···0 | LAYER···0 | LAYER···0 |
| RESOLUTION LEVEL 0 | RESOLUTION LEVEL 0 | RESOLUTION LEVEL 0 | RESOLUTION LEVEL 1 | RESOLUTION LEVEL 1 | RESOLUTION LEVEL 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 6 | PACKET 7 | PACKET 8 | PACKET 9 | PACKET 10 | PACKET 11 |
|---|---|---|---|---|---|
| LAYER···0 | LAYER···0 | LAYER···0 | LAYER···0 | LAYER···0 | LAYER···0 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 12 | PACKET 13 | PACKET 14 | PACKET 15 | PACKET 16 | PACKET 17 |
|---|---|---|---|---|---|
| LAYER···0 | LAYER···0 | LAYER···0 | LAYER···0 | LAYER···0 | LAYER···0 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 0 | PRECINCT 1 | PRECINCT 2 | PRECINCT 3 |

| PACKET 18 | PACKET 19 | PACKET 20 | PACKET 21 | PACKET 22 | PACKET 23 |
|---|---|---|---|---|---|
| LAYER···1 | LAYER···1 | LAYER···1 | LAYER···1 | LAYER···1 | LAYER···1 |
| RESOLUTION LEVEL 0 | RESOLUTION LEVEL 0 | RESOLUTION LEVEL 0 | RESOLUTION LEVEL 1 | RESOLUTION LEVEL 1 | RESOLUTION LEVEL 1 |
| COMPONENT 0 | COMPONENT 1 | COMPONENT 2 | COMPONENT 0 | COMPONENT 1 | COMPONENT 2 |
| PRECINCT 0 | PRECINCT 0 | PRECINCT 0 | PRECINCT 0 | PRECINCT 0 | PRECINCT 0 |

| PACKET 24 | PACKET 25 | PACKET 26 | PACKET 27 | PACKET 28 | PACKET 29 |
|---|---|---|---|---|---|
| LAYER···1 | LAYER···1 | LAYER···1 | LAYER···1 | LAYER···1 | LAYER···1 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 0 | COMPONENT 0 | COMPONENT 0 | COMPONENT 0 | COMPONENT 1 | COMPONENT 1 |
| PRECINCT 0 | PRECINCT 1 | PRECINCT 2 | PRECINCT 3 | PRECINCT 0 | PRECINCT 1 |

| PACKET 30 | PACKET 31 | PACKET 32 | PACKET 33 | PACKET 34 | PACKET 35 |
|---|---|---|---|---|---|
| LAYER···1 | LAYER···1 | LAYER···1 | LAYER···1 | LAYER···1 | LAYER···1 |
| RESOLUTION LEVEL 2 | RESOLUTION LEVEL 2 | RESOLUTION LEVEL 2 | RESOLUTION LEVEL 2 | RESOLUTION LEVEL 2 | RESOLUTION LEVEL 2 |
| COMPONENT 1 | COMPONENT 1 | COMPONENT 2 | COMPONENT 2 | COMPONENT 2 | COMPONENT 2 |
| PRECINCT 2 | PRECINCT 3 | PRECINCT 1 | PRECINCT 2 | PRECINCT 3 | PRECINCT 4 |

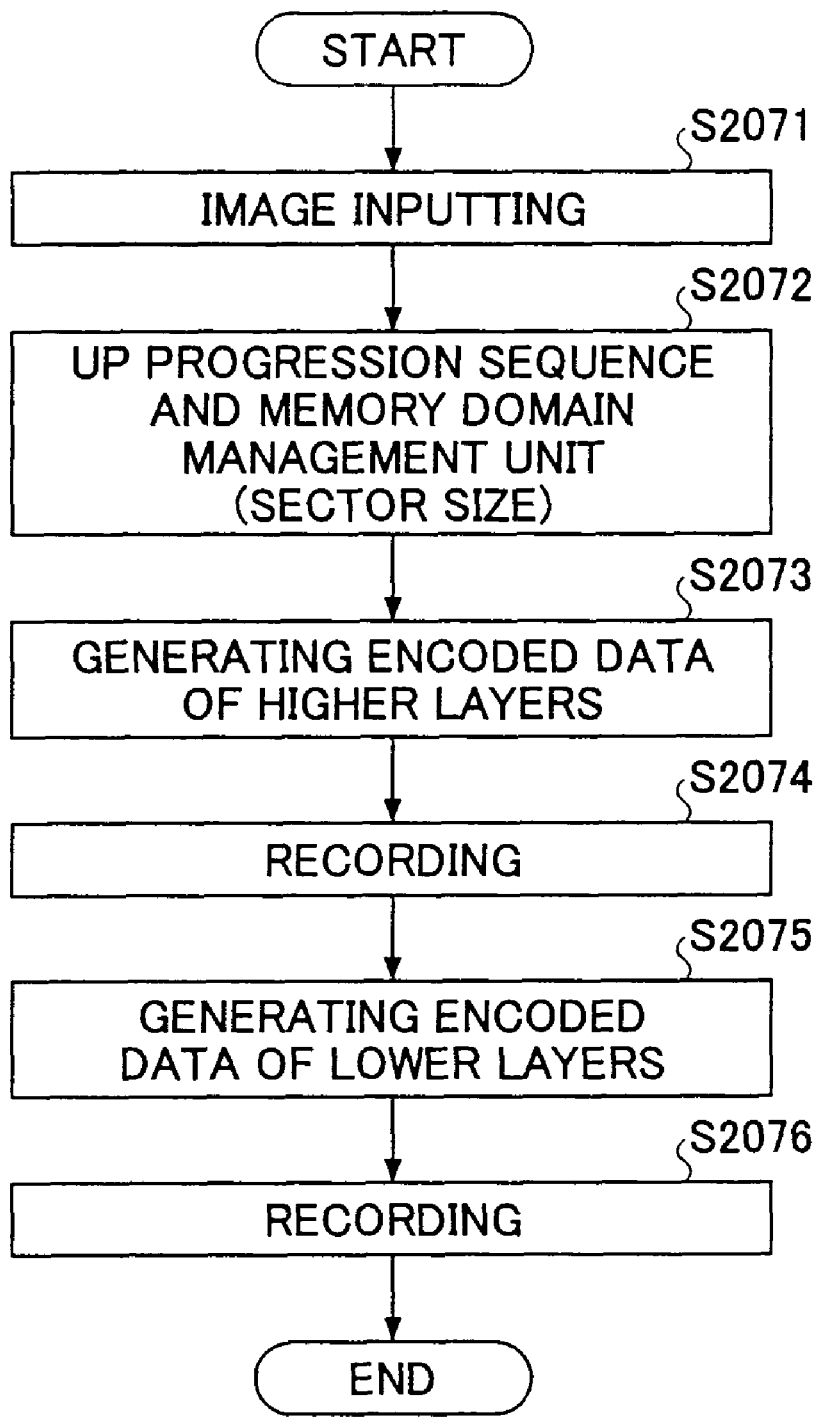

IMAGE-PROCESSING APPARATUS, AN IMAGE-PROCESSING METHOD, A PROGRAM, AND A MEMORY MEDIUM

The present application claims priority to the corresponding Japanese Application No. 2002-244530 filed on Aug. 26, 2002, the entire contents of which are hereby incorporated by reference.

BACKGROUND OF THE INVENTION

1. Field of the Invention

The present invention generally relates to various kinds of image-processing apparatuses, and a memory medium in which encoded image data are stored as a file.

2. Description of the Related Art

Since the amount of image data generally becomes great, it is common for compression coding to be carried out in advance of recording in a memory medium (recording medium). Various conventional compression coding technologies are available.

For example, Japanese Provisional Publication No. H5-64001 discloses an image-processing apparatus, wherein it is determined whether the amount of compressed image data exceeds the capacity of the memory medium for storing the compressed image data, and when it is determined in the affirmative, the compressed data are expanded, and then recompressed at a higher compression rate. In addition, another image-processing apparatus is also disclosed, wherein an image is divided into compression units, each of which is compressed, the amount of the compressed image data is compared with a predetermined size, the compression rate is adjusted according to the comparison result, and the compression is repeated for every compression unit. An image-processing apparatus similar to this is disclosed by Japanese Provisional Publication No. H6-22152.

Generally, the memory domain of a memory medium is managed in certain units (memory domain management units, or sectors), each unit (sector) being capable of storing a predetermined amount of data, and a number of such units are assigned for storing a file of, among other things, a compressed image.

Although various proposals have been disclosed for controlling the compression rate as described above, a technology that takes the memory domain management unit of the memory medium into consideration is not found in the conventional technologies. For this reason, when the file size of a compression image is 550 bytes where the sector is capable of storing 512 bytes, for example, two sectors, capable of storing 1024 bytes, are required, wasting 474 bytes of the memory domain. This is undesirable in respect to the efficient utilization of the memory medium. Especially, in the case of a memory medium that should be as small as possible and capable of storing as much data as possible, such as various memory cards used in digital cameras and portable apparatuses, waste of the memory domain should be avoided as much as possible.

SUMMARY OF THE INVENTION

An image method and apparatus for processing data is disclosed. In one embodiment, the image processing or an image-processing apparatus that stores encoded data of an image as a file in a memory medium in the image-processing apparatus, or externally, comprising a unit to adjust file size of the image data based on a memory domain management unit of the memory medium such that the file size becomes near, but does not exceed an integer multiple of the memory domain management unit of the memory medium.

BRIEF DESCRIPTION OF THE DRAWINGS

FIG. 1 is a simplified block diagram illustrating an algorithm of JPEG 2000.

FIG. 5 shows an example of a packet and layer division.

FIG. 15 shows an arrangement sequence and an interpretation sequence of packets in the case of LRCP progression.

FIG. 16 is a flowchart illustrating operation mode 8.

DESCRIPTION OF THE PREFERRED EMBODIMENTS

Figure 2A:
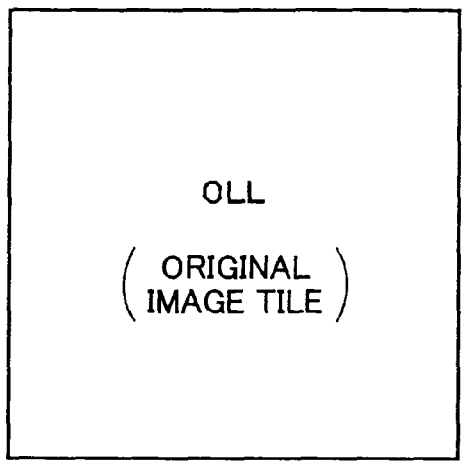
FIGS. 2A-2D are drawings illustrating a 2-dimensional wavelet transform where there are three decomposition levels.

Accordingly, one embodiment of the present invention provides an image-processing apparatus, an image-processing method, a program, and a memory medium that substantially obviate one or more of the problems caused by the limitations and disadvantages of the related art.

Specifically, one embodiment of the present invention decreases waste of the memory medium as much as possible in the image-processing apparatus.

Features and advantages of the present invention are set forth in the description that follows, and in part will become apparent from the description and the accompanying drawings, or may be learned by practice of the invention according to the teachings provided in the description. Other features and advantages of the present invention will be realized and attained by the image-processing apparatus, the image-processing method, the program, and the memory medium particularly pointed out in the specification in such full, clear, concise, and exact terms as to enable a person having ordinary skill in the art to practice the invention.

To achieve these and other advantages and in accordance with purposes of the invention, as embodied and broadly described herein, embodiments of the present invention provide solutions as follows.

In one embodiment, the image-processing apparatus of the present invention, which stores encoded data of an image as a file in a memory medium inside the apparatus, or external to the apparatus, adjusts the file size of the encoded data stored in the memory medium based on a memory domain management unit (sector) of the memory medium such that the file size becomes close to, but does not exceed an integer multiple of the memory domain management unit (sector) of the memory medium.

In one embodiment, when adjusting the file size, the image-processing apparatus of the present invention processes the encoded data in a state of encoded codes, as they are.

The image-processing apparatus of the present invention may be provided with an image compression unit for carrying out compression coding of the image, and for generating the encoded data, which also carries out the file size adjustment.

In one embodiment, the image-processing apparatus of the present invention includes with a capability of selecting a method of code discarding for the file size adjustment.

Where the encoded data are structured by a plurality of layers, an embodiment of the image-processing apparatus of the present invention is capable of restructuring each of the layers, when the file size adjustment is carried out.

Where the encoded data are structured by a plurality of layers, one embodiment of the image-processing apparatus of the present invention is capable of adjusting the file size of one or more lower-ranking layers approximately equal to an integer multiple of the memory domain management unit (sector), the lower-ranking layers being layers lower than a predetermined specific layer of the encoded data.

Where the encoded data are structured by a plurality of layers, one embodiment of the image-processing apparatus of the present invention changes a sequence of progression, and revises layer division, when adjusting the file size of the encoded data.

When adjusting the file size of the encoded data, one embodiment of the image-processing apparatus of the present invention is capable of dividing the encoded data into a plurality of groups or sets of encoded data.

In one embodiment, the image-processing apparatus of the present invention is capable of performing the file size adjustment in units of a desired memory domain management unit (sector size).

Further, embodiments of the present invention include an image-processing method, a program, and a memory medium that realize the image-processing apparatus of the present invention as described above.

In the following, embodiments of the present invention are described with reference to the accompanying drawings.

First, an algorithm of JPEG 2000 is briefly explained to the extent that is desirable for understanding the embodiments of the present invention. Details of the algorithm of JPEG 2000 are available from published books, such as "Next-generation Image Coding System JPEG 2000" by Yasuyuki Nomizu (Triceps, Inc.).

Encoded data that are processed in the embodiments of the present invention explained below are encoded data of a still image of JPEG 2000 (ISO/IEC FCD 15444-1), and encoded data of a moving picture of Motion-JPEG 2000 (ISO/IEC FCD 15444-3). In Motion-JPEG 2000, the moving picture is realized by a series of continuous still images, each serving as a frame, and the encoded data of each frame are based on JPEG 2000, with the only difference being the file format, which differs from JPEG 2000 in part.

FIG. 1 is a simplified block diagram illustrating the algorithm of JPEG 2000. A set of image data (a still image frame, when treating a moving picture), which is the object of a compression process, is divided into tiles for every component. In one embodiment, the tiles are rectangular domains that do not overlap each other. The compression process is applied to each of the tiles for each component. Here, it is also possible to make tile size the same as that of the image size, i.e., not to perform tile division.

As for a tile image, color space conversion from RGB data or CMY data to YCrCb data is performed such that the compression rate is improved (Step S1). Here, the color space conversion may be skipped.

On each tile image of each component after the color space conversion, 2-dimensional wavelet transform (discrete wavelet transform: DWT) is performed (Step S2).

Figure 2B:
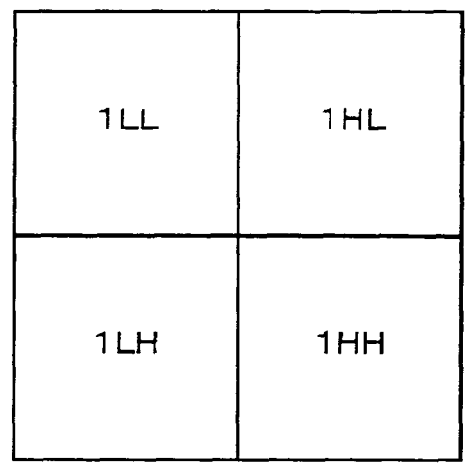
Figure 2C:
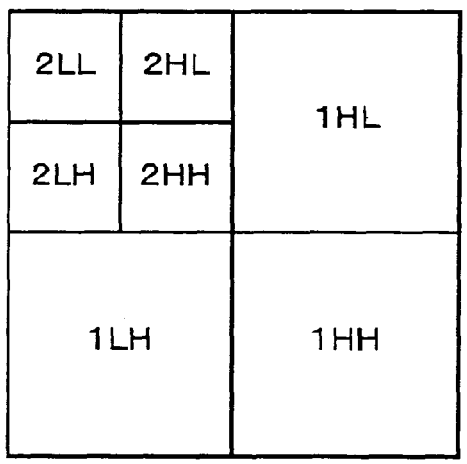
Figure 2D:
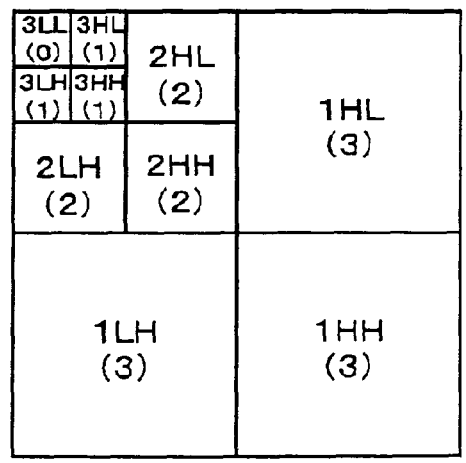

The wavelet transform in the case of three decomposition levels is explained with reference to FIGS. 2A-2D. A tile image, the decomposition level of which is 0, as shown at FIG. 2A, is divided by the 2-dimensional wavelet transform into sub-bands of decomposition level 1, namely, 1LL, 1HL, 1LH, and 1HH as shown at FIG. 2B, and coefficients are obtained. Then, by applying the 2-dimensional wavelet transform to the coefficients, the sub-band 1LL is further divided into sub-bands of decomposition level 2, namely, 2LL, 2HL, 2LH, and 2HH as shown at FIG. 2C, and coefficients are obtained. Further, by applying the 2-dimensional wavelet transform to the coefficients, the sub-band 2LL is divided into sub-bands of decomposition level 3, namely, 3LL, 3HL, 3LH, and 3HH, as shown at FIG. 2D, and coefficients are obtained.

The coefficients of the wavelets obtained by recursive division (octave division) of a low frequency component (LL sub-band coefficient), as described above, are quantized for every sub-band (Step S3). In JPEG 2000, both "lossless" (reversible) compression and "lossy" (irreversible) compression are possible. If lossless compression is carried out, the quantization step width is always set at 1, and the data are not quantized at this stage.

After quantization, entropy coding of each sub-band coefficient is carried out (Step S4). As for the entropy coding, a coding system called EBCOT (Embedded Block Coding with Optimized Truncation) is used, which includes block division, coefficient modeling, and binary arithmetic coding. A bit plane of each sub-band coefficient after quantization is encoded for every block (called "code block") from a higher rank plane to a low rank plane.

Steps S5 and S6 are code generating processes. First, at step S5, a packet is generated by collecting codes of the code blocks generated at Step S4. At Step S6, the packets generated at Step S5 are put in order according to a sequence of progression (progression sequence), and tag information is added, such that encoded data in a predetermined format are generated. As for code sequence control, the progression sequence of JPEG 2000 is defined by a resolution level, precinct (position), a layer, and a component (color composition).

Figure 3:
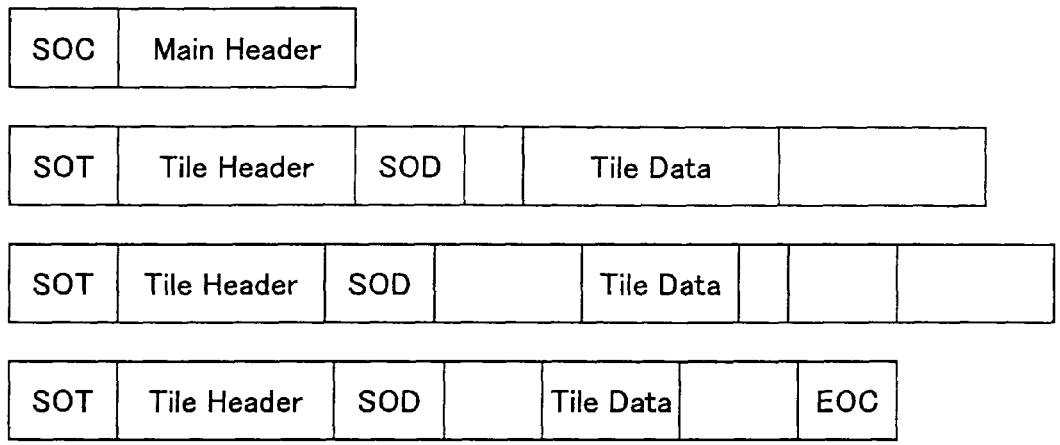
FIG. 3 shows a format of data encoding of JPEG 2000.

The format of the encoded data of JPEG 2000 generated in this manner is shown by FIG. 3. The encoded data starts with a SOC marker, and includes a main header (Main Header) that describes a coding parameter, a quantization parameter, etc., followed by encoded data for every tile as shown by FIG. 3. The encoded data for every tile starts with a SOT marker, followed by a tile header, a SOD marker, and tile data. An EOC marker that defines the end is placed after the final tile data.

The algorithm of JPEG 2000 provides a high quality image even when the compression rate is high (i.e., at a low bit rate), and other features as described below.

One of the JPEG 2000 features is being able to adjust the amount of the encoded data without performing recompression by post-quantization by discarding (truncation) of codes of the encoded data. The code discarding (truncation) can be performed in various units, such as domains like tiles and precincts, components, decomposition levels (or resolution levels), bit planes, sub-bit planes, packets, and layers in the case of a multi-layer structure. As for the relations between decomposition levels and resolution levels, the number associated with each sub-band given in parenthesis at FIG. 2D indicates the resolution level of the corresponding sub-band.

Another JPEG 2000 feature is being able to restructure the layer of the encoded data under a code state, i.e., the encoded data as they are. Another feature is being able to restructure the encoded data of a certain progression sequence to encoded data of another progression sequence under the code state. Further, another feature is being able to divide the encoded data of a multi-layer structure into two or more sets of encoded data in units of layers under the code state.

Here, a brief explanation is presented about the precinct, the code block, the packet, and the layer. The following size relations exist: image>=tile>=sub-band>=precinct>=code block.

Figure 4:
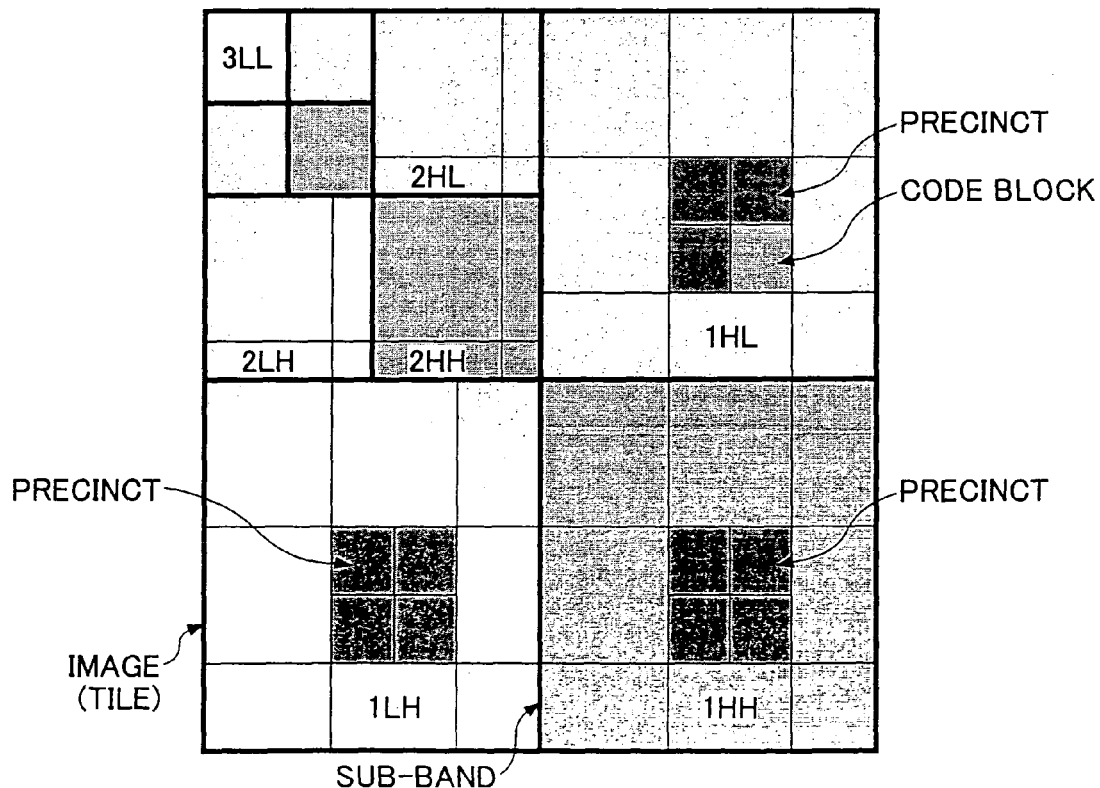
FIG. 4 is a drawing illustrating a precinct and a code block.

A precinct is one or more rectangular domains of sub-bands. A group of three domains of sub-bands HL, LH, and HH belonging to the same decomposition level and having the same relative spatial position are treated as a precinct. In the case of the LL sub-band, however, one domain alone is treated as a precinct. Here, it is also possible to make the size of the precinct be the same size as the sub-band. Further, a rectangular domain that is a division of a precinct is a code block. FIG. 4 illustrates a precinct and a code block in the decomposition level 1. The three domains that are indicated as "PRECINCT" in FIG. 4, which are located spatially in the same relative position, are treated as one precinct.

The packet is a collection (assembly) of parts of codes (for example, the codes of three sheets of the bit plane, i.e., from MSB to the third bit) of all the code blocks of the precinct. An empty packet is also allowed. Packets are generated by collecting the codes of the code blocks, and are arranged in a desired progression sequence, such that encoded data are generated. With reference to FIG. 3, the portion that follows SOD of each tile header represents a set of the packets.

The layer is generated by collecting the packets of all the precincts (that is, all the code blocks, and all the sub-bands). In one embodiment, the layer is a part of codes of the entire image region (for example, codes of the highest tier bit plane through codes of the third tier bit plane of the wavelet coefficients of the entire image region). However, it is not necessary that the layer include the packets of all the precincts, as described later. Accordingly, where there are a larger number of layers that are decoded at the time of expansion, a higher quality image can be reproduced. In this manner, the layer can represent the quality of the image. If all the layers are collected, the codes of all the bit planes of the entire image region are obtained.

Figure 5:
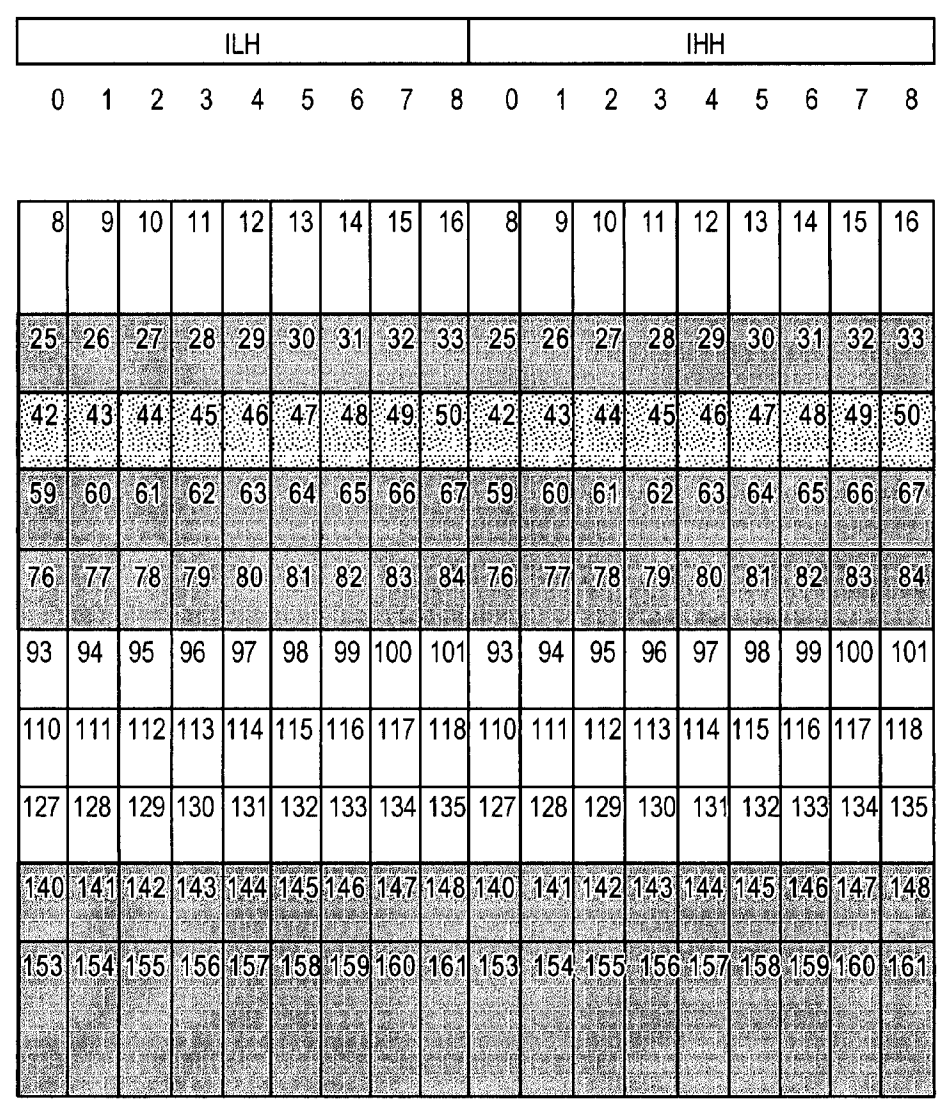

FIG. 5 shows an example of packets and layers, where the decomposition level is set at 2 (i.e., the resolution level=3). In FIG. 5, rectangles represent packets, wherein packet numbers are shown. Layers are represented by rectangular domains with different shades. In this example, nine layers are shown, namely, layer 0 that includes the packets of the packet numbers 0 through 16, layer 1 that includes the packets of the packet numbers 17 through 33, layer 2 that includes the packets of the packet numbers 34 through 50, layer 3 that includes the packets of the packet numbers 51 through 67, layer 4 that includes the packets of the packet numbers 68 through 84, layer 5that includes the packets of the packet numbers 85 through 101, layer 6 that includes the packets of the packet numbers 102 through 118, layer 7 that includes the packets of the packet numbers 119 through 135, layer 8 that includes the packets of the packet numbers 136 through 148, and layer 9 that includes the packet of the packet numbers 149 through 161. The relations between the packets and the precincts, etc., vary depending on the progression sequence, the number of divided layers, etc. Therefore, the layer structure as described above is an example.

Figure 6:
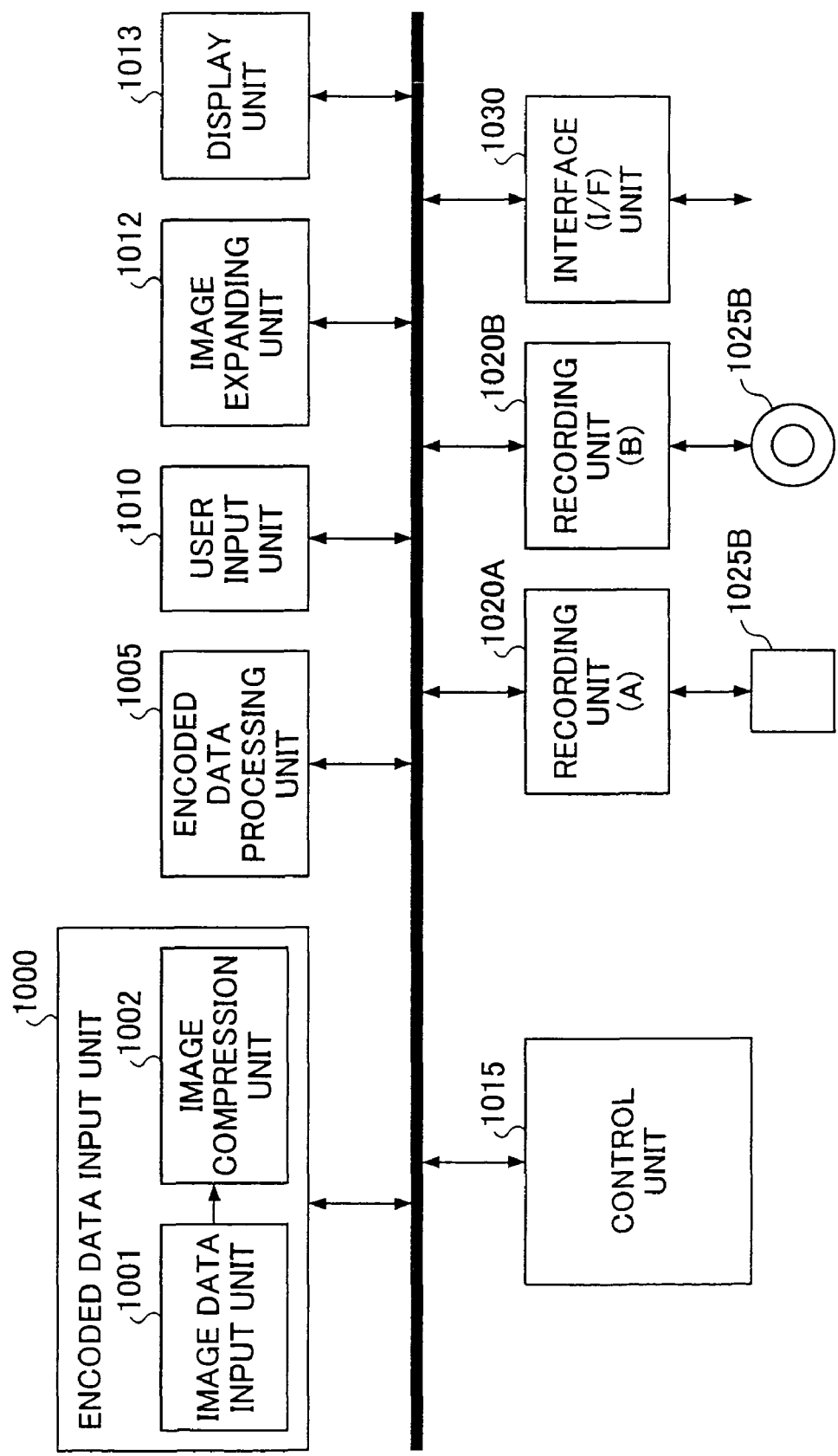
FIG. 6 is a block diagram illustrating an embodiment of the present invention.

Next, embodiments of the present invention are described. FIG. 6 is a block diagram illustrating the embodiments of the present invention. FIG. 6 includes: an encoded data input unit 1000 that further includes an image data input unit 1001 and an image compression unit 1002, an encoded data processing unit 1005, a user input unit 1010, an image expanding unit 1012, a display unit 1013, a control unit 1015, a recording unit A 1020A, a recording unit B 1020B, a memory medium 1025A, another memory medium 1025B, and an interface (I/F) 1030.

The encoded data input unit 1000 inputs encoded image data, which may be either one of still image data and moving picture data. In the example shown here, the encoded data input unit 1000 further includes the image data input unit 1001 for inputting the image data, and the image compression unit 1002 for carrying out compression coding of the image data and generating encoded data of either a still image based on JPEG 2000 or a moving picture based on Motion-JPEG 2000, depending on the image data that are input.

The image data input unit 1001 takes a picture, such as a picture taking unit of a digital camera, and takes in image data from another apparatus through a cable or radio transmission path, a network, and the like.

That is, an embodiment of the present invention includes the image compression unit 1002 in the encoded data input unit 1000, and carries out compression coding of encoded data taken in from another apparatus through a cable or radio transmission path, a network, and the like.

In addition, in an embodiment of the present invention, the encoded data input unit 1000 does not include the image compression unit 1002, and encoded data are taken in from another apparatus through a cable or radio transmission path, a network, and the like.

The recording unit 1020A stores encoded data as an image file in the memory (recording) medium 1025A, such as a memory card and a disk medium, and for reading the image file. The recording unit 1020B stores the encoded data as an image file in the memory (recording) medium 1025B, such as a memory card and a disk medium, which may be the same kind as, or a different kind from the memory medium 1025A, and for reading the image file.

The interface (I/F) 1030 outputs the encoded data of the image to an external apparatus such as an external storage device and a personal computer, and inputs encoded data from another apparatus through a cable or radio transmission path, a network, and the like.

In addition, in an embodiment of the present invention, the number of the recording units is not necessarily two. That is, the number of the recording units may be one, three, and greater than three. Further, in one embodiment of the present invention, the image-processing apparatus does not include the recording unit, and the encoded data are stored by an external storage device, an external computer, and the like.

The encoded data processing unit 1005 processes the encoded data as they are, and performs editing. In addition, in one embodiment of the present invention, the image-processing apparatus does not include the encoded data input unit 1000, and the encoded data stored in the memory medium (1025A, 1025B) are the processing target of the encoded data processing unit 1005.

The user input unit 1010 inputs various instructions, etc., of a user to the control unit 1015. The user input unit 1010 is not limited to means directly operated by the user, but may take in the instructions according to user operation of an external apparatus such as a personal computer, the instructions being transmitted through the cable or radio transmission path.

The image expanding unit 1012 decodes the encoded data and expands the decoded data into image data. The display unit 1013 displays the image data and other information, and is used, among other things, when specifying an image file to read.

The control unit 1015 controls the processing unit 1005 for processing the encoded data, controls the image compression unit 1002 for control processing and the like, in addition to controlling the entire image-processing apparatus.

The image-processing apparatus, having the structure as described above, provides a plurality of different operation modes. A desired mode is selected through the user input unit 1010. Next, operations of the image-processing apparatus in each operation mode are explained.

<<Operation Mode 1>>

Figure 7:
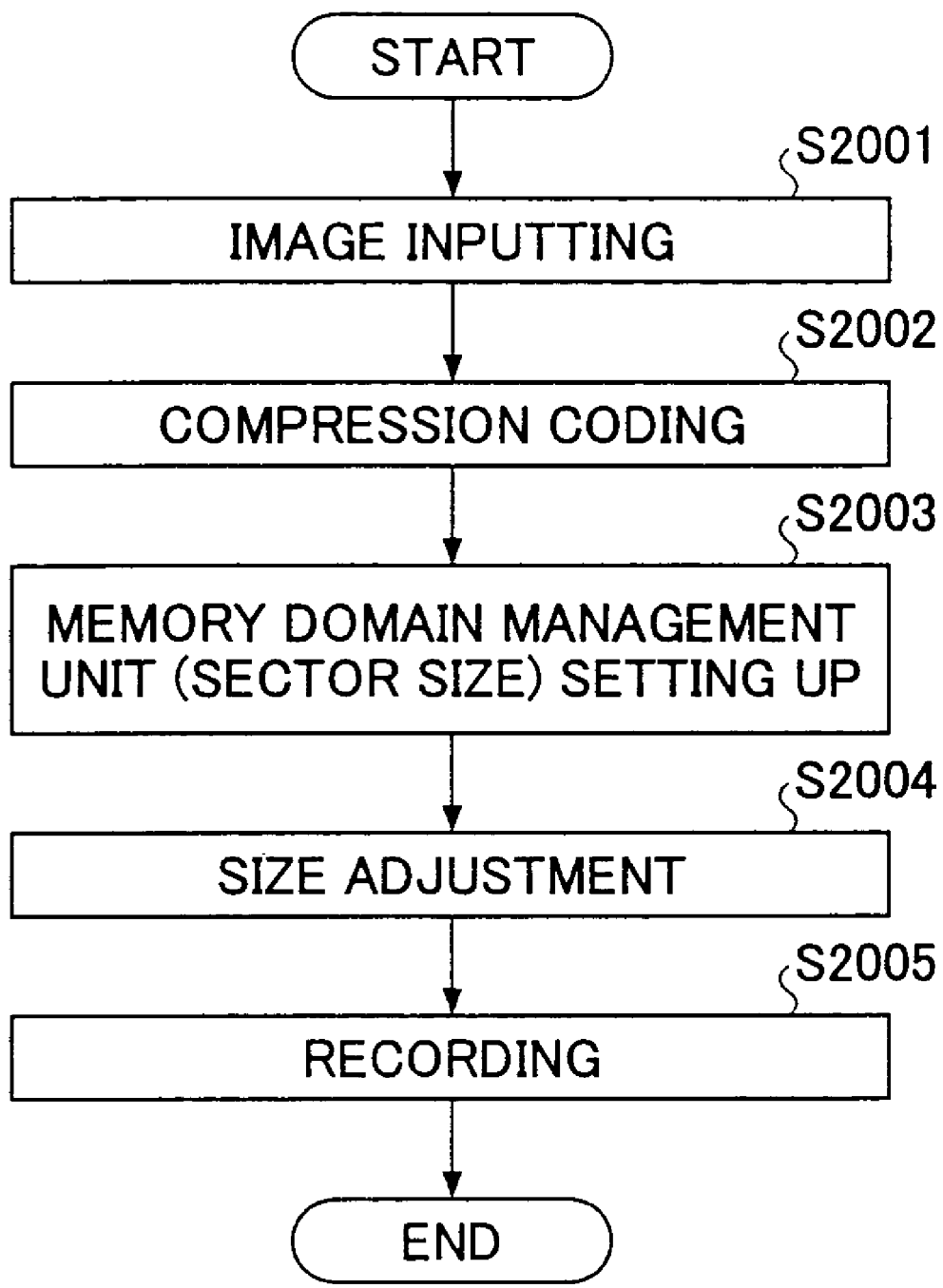
FIG. 7 is a flowchart illustrating operation mode 1.

Under operation mode 1, image data are compressed and encoded, and the encoded image data are stored in the memory medium (1025A, 1025B, or an external storage device) as an image file. The outline flow of operation mode 1 is shown by FIG. 7.

At Step S2001, the image data that are taken or received from an external source are input to the image data input unit 1001.

At Step S2002, the input image data are compressed by the image compression unit 1002 according the algorithm of JPEG 2000. Here, the user input unit 1010 beforehand specifies which one of the "lossless" compression coding and the "lossy" compression coding should be used. The compressed encoded data are provided to the encoded data processing unit 1005. In the case that lossy compression coding is selected, the user input unit 1010 beforehand specifies a compression rate, such as high quality, medium quality, or low quality of the image. The control unit 1015 controls the operation according to the compression rate specified.

At Step S2003, the control unit 1015 sets up a memory domain management unit (sector size) to be used by the encoded data processing unit 1005. The memory domain management unit (sector size) is set up in the memory medium where the encoded data are to be stored. When the encoded data are to be stored in either one of the memory media 1025A and 1025B, the memory domain management unit (sector size) of the applicable memory medium (1025A or 1025B) is set up. When the encoded data are to be stored in an external storage device, the memory domain management unit (sector size) of the external storage device is set up. The user input unit 1010 specifies a memory medium in which the encoded data are to be stored. If none is specified, a predetermined default memory medium is selected.

Here, it is also possible to specify a desired memory domain management unit (sector size) through the user input unit 1010, regardless of the memory domain management unit (sector size) of the memory medium (first memory medium) in which the encoded data are to be stored. In this case, the desired memory domain management unit (sector size) specified by the user input unit 1010 is set up in the encoded data processing unit 1005. The reason for allowing the user to specify a different memory domain management unit (sector size) is because it is often rational to take into consideration the memory domain management unit (sector size) of a second memory medium, when there is a possibility of transmitting and copying the encoded data into the second memory medium in the future.

At Step S2004, the encoded data processing unit 1005 calculates present file size FS by totaling the amount of the input encoded data and the size of the file header of JPEG 2000. Next, an integer value N is obtained, where the integer value N is no smaller than any other integer value wherein N multiplied by the memory domain management unit (sector size) SS does not exceed the file size FS, that is, N×SS<FS. Then, in one embodiment, the amount of the encoded data is optimized by performing code discarding (post quantization) of the encoded data such that the file size becomes as close as possible to N×SS, but does not exceed N×SS. That is, the encoded data processing unit 1005 adjusts the amount of the encoded data. When the adjustment takes place, the header information and the like of the encoded data are revised as necessary.

In the case that the encoded data are input by compression encoding by the image compression unit 1002, the amount adjustment of the encoded data can be performed by discarding a part of the code in the code generating process of the image compression unit 1002. That is, an embodiment that uses the image compression unit 1002 to adjust the amount of the encoded data is also included in one embodiment of the present invention.

At Step S2005, the encoded data, the amount of which is optimized by the encoded data processing unit 1005, are stored as an image file in the memory medium 1025A by the recording unit 1020A, or are stored in the memory medium 1025B by the recording unit 1020B. When an external storage device is specified as the storing destination, the encoded data are transmitted through the interface unit 1030, and stored in the external storage device as an image file. Since the file size adjustment of the encoded data, as described above, is performed, the entire, or almost entire region of the memory domain assigned to the image file can be effectively used, resulting in minimal waste.

Here, if the structure is such that the encoded data input unit 1000 takes in encoded data directly from an external source, Steps S2001 and S2002 are replaced by a step in which such encoded data are taken in. When processing a moving picture, optimization of the encoded data amount, as described above, is performed according to the encoded data of the still image of each frame.

<<Operation Mode 2>>

Figure 8:
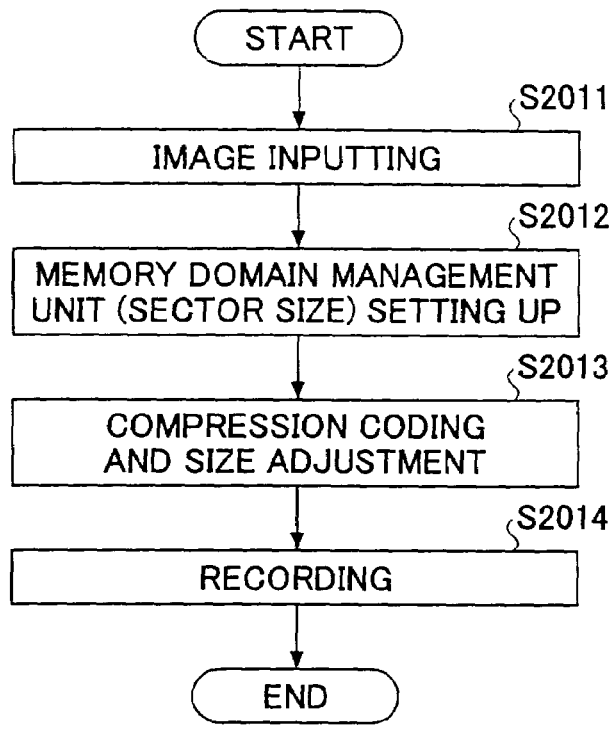
FIG. 8 is a flowchart illustrating operation mode 2.

Operation mode 2 also carries out compression coding of image data, and stores the encoded data in the memory medium (1025A, 1025B, or an external storage device). In one embodiment, the encoded data is a multi-layer structure. An outline flow is shown by FIG. 8.

At Step S2011, the image data taken or provided by an external source are input to the image data input unit 1001.

At Step S2012, the control unit 1015 sets up a memory domain management unit (sector size), and controls the image compression unit 1002 such that a layer division process is performed, based on the memory domain management unit (sector size) of the memory medium in which the encoded data are to be stored. The memory medium, in which the encoded data are to be stored, can be specified by the user input unit 1010. When none is specified, a default memory medium is selected.

Here, it is also possible for the user input unit 1010 to specify a desired memory domain management unit (sector size), regardless of the memory domain management unit (sector size) of the memory medium in which the encoded data are to be stored. The purpose thereof is as previously described in relation to operation mode 1.

Figure 9:
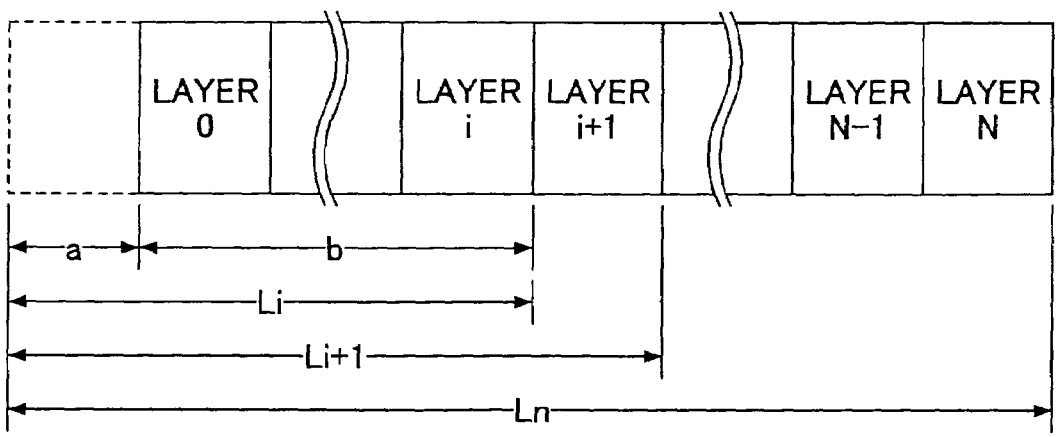
FIG. 9 is a drawing illustrating file size adjustment of encoded data of a multi-layer structure.

At Step S2013, the image compression unit 1002 carries out lossless or lossy compression coding of the input image data according to the algorithm of JPEG 2000. At that time, layer division is carried out, based on the memory domain management unit (sector size) in the code generation process. That is, as shown by FIG. 9, layers 0 through i, having a total file size "b," are constituted such that a sum Li of the total file size "b" of the layers 0 through i of the encoded data and a file header size "a" become as close as possible to, but do not exceed an integer value times the memory domain management unit (sector size). Here, i>=0, i is an integer, i can be specified by the user input unit 1010, and where i is not specified, a predetermined default value is used.

Specifically, a process is performed such that packets are allocated one by one to the layer i concerned, and when the layer i is adequately loaded, the layer i is closed, as shown by FIG. 9. Then, a layer i+1 is constituted such that a sum Li+1 of the total file size of the layers 0 through i+1 of the encoded data and the file header size do not exceed, but become as close as possible to an integer multiple of the memory domain management unit (sector size). Subsequently, the same layer division process is carried out until i becomes N, where N represents the last layer. As a result, the size of each layer after the layer i+1 approximately becomes, but does not exceed, the size of the integer multiple of the memory domain management unit (sector size). About structuring the layer N, which is the last layer, the following two methods are available, one of which is to be specified by the user input unit 1010, and if none is specified, a predetermined default method is selected.

Methods For Structuring The Last Layer:

(1) By All Remaining Codes:

When this method is selected, the image file size, which is a sum Ln of the amount of the encoded data of the layers 0 through N, i.e., all the layers, and the size of the file header, may not necessarily become less than and close to an integer multiple value times the memory domain management unit (sector size). However, if codes of the last layer are discarded by post-quantization, the size becomes as described above.

(2) By Discarding Codes:

The last layer is structured such that the amount Ln becomes as close as possible to, but does not exceed an integer multiple value times the memory domain management unit (sector size), with the remainder of the codes being discarded. In this case, the size of the last layer also becomes almost the size of an integer multiple of the memory domain management unit (sector size).

As described above, in operation mode 2, the image compression unit 1002 is used for adjusting the file size of the encoded data.

The user input unit 1010 can specify which one of the lossless compression coding and the lossy compression coding is to be performed. Where none is specified, a predetermined default compression coding is performed. Further, the compression rate of the lossy compression coding is controlled by the control unit 1015 according to a quality-of-image level selected beforehand by the user input unit 1010, such as high definition, medium quality, and low quality of the image.

At Step S2014, the encoded data, the amount of which is adjusted by the image compression unit 1002, are stored in the memory medium 1025A or 1025B by the recording unit 1020A or 1020B, respectively, as an image file, or are transmitted to an external storage device through the interface unit 1030, and stored in the external storage device as an image file. If the method (2) described above is used for the last layer of the encoded data, the entire region, or almost the entire region of the memory domain assigned to the image file is effectively used, and the efficient utilization of the memory medium is enhanced.

When the method (1) for the last layer described above is used, the entire region, or almost the entire region of the memory domain assigned to the image file is effectively used, if the codes of the last layer are discarded. Further, waste of the memory domain is avoided by deleting the codes of the layers that are lower than the layer i.

In addition, in the case of a moving picture, the same process as performed for the still image is performed for each frame.

<<Operation Mode 3>>

Figure 10:
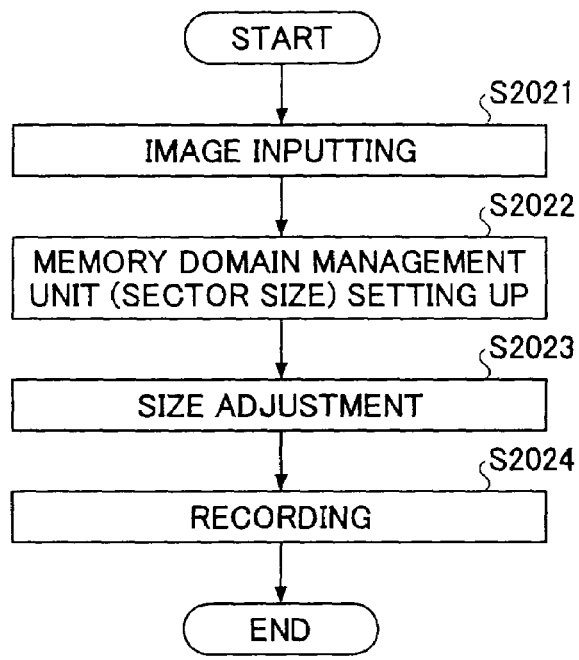
FIG. 10 is a flowchart illustrating operation mode 3.

Operation mode 3 adjusts the file size of the encoded data stored in a first memory medium as an image file by any one of operation mode 1, operation mode 3, and operation mode 5 (described below) to a size suitable for a second memory medium, and stores the encoded data in the second memory medium. The processing flow of operation mode 3 is shown by FIG. 10. In this case, the user input unit 1010 beforehand specifies the first memory medium that stores the target image file, and the second memory medium for storing the re-sized encoded data file.

At Step S2021, the image file specified by the user input unit 1010 is read from the first memory medium (1025A, 1025B, or an external storage device).

At Step S2022, the memory domain management unit (sector size) corresponding to the second memory medium (1025A, 1025B, or an external storage device), serving as the storing destination, is set to the encoded data processing unit 1005 by the control unit 1015. Here, the user input unit 1010 may specify any desired memory domain management unit (sector size), in which case, the memory domain management unit (sector size) specified in this manner is set up. The purpose of allowing the user to so specify is as previously explained in relation to operation mode 1.

At Step S2023, the encoded data processing unit 1005 obtains an integer value N, where the integer value N is no smaller than any other integer value where N× the memory domain management unit (sector size) SS does not exceed the file size FS, that is, N×SS<FS. Then, the amount of the encoded data is optimized by performing code discarding of the encoded data such that the file size becomes as close as possible to N×SS, but does not exceed N×SS. At the same time, the header information of the encoded data and the like are also updated as needed. Thus, in this operation mode, the encoded data processing unit 1005 adjusts the file size of the encoded data.

At Step S2024, the encoded data, the amount of which is optimized, are stored in the second memory medium as an image file. As described above, since file size adjustment of the encoded data is performed, the entire or almost the entire region of the memory domain assigned to the image file is effectively used, and the efficient utilization of the memory medium is enhanced.

When processing a moving picture, optimization of the encoded data amount by discarding codes is performed in the same way as the encoded data of the still image for each frame.

<<Operation Mode 4>>

Figure 11:
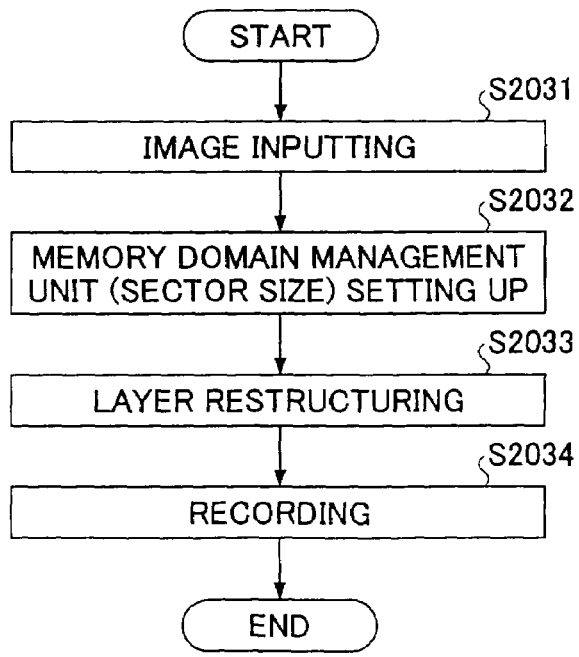
FIG. 11 is a flowchart illustrating operation mode 4.

Operation mode 4 converts first encoded data of a multi-layer structure, which are currently stored in a first memory medium as an image file by one of operation mode 2, operation mode 6 (described below), and this operation mode, into second encoded data of a multi-layer structure suitable for a second memory medium. The processing flow of operation mode 4 is shown by FIG. 11. In this case, the user input unit 1010 specifies beforehand the first memory medium that stores the first encoded data, and the second memory medium that serves as the storing destination of the second encoded data.

At Step S2031, the image file, i.e., the first encoded data, specified by the user input unit 1010 is read from the first memory medium (1025A, 1025B, or the external storage device).

At Step S2032, the memory domain management unit (sector size) of the second memory medium (1025A, 1025B, or the external storage device) serving as the storing destination is set to the encoded data processing unit 1005 by the control unit 1015. The user input unit 1010 may specify a desired memory domain management unit (sector size), in which case, the memory domain management unit (sector size) specified is set up. The purpose of allowing the user input unit 1010 to so specify is as previously described in relation to operation mode 1.

At Step S2033, when the encoded data processing unit 1005 adjusts the file size such that the read encoded data of the image file become appropriate in amount for the memory domain management unit (sector size) that is set up, restructuring of the layer is also performed. The process of restructuring of the layer is the same as the process explained in relation to Step S2013 of FIG. 8. As for processing the last layer, the process that is the same as Step S2013 also applies. The header information of the encoded data and the like are also updated as needed. As described above, in this operation mode, the encoded data processing unit 1005 adjusts the file size and reconstructing the layer of the encoded data.

At Step S2034, the encoded data, the amount of which is optimized, are stored in the second memory medium as an image file. Since file size adjustment of the encoded data and layer restructuring are performed as described above, the memory domain can be assigned to the image file with no waste. Further, even if codes of a lower ranked layer of the encoded data of the image file are discarded afterwards, there is very little waste of the memory domain.

In addition, in the case of a moving picture, the same process is performed as in the case of the encoded data of the still image for each frame.

<<Operation Mode 5>>

Figure 12:
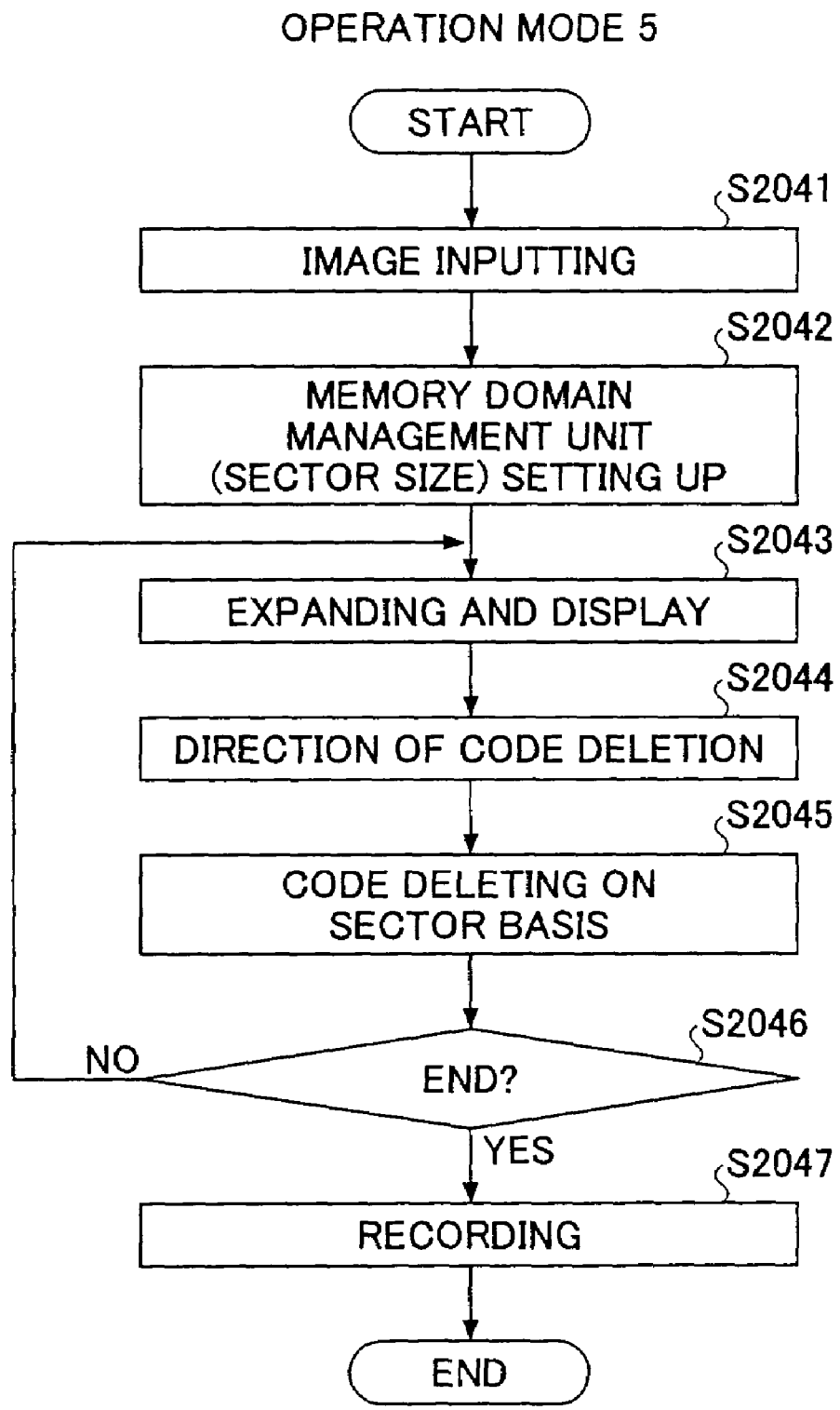
FIG. 12 is a flowchart illustrating operation mode 5.

Operation mode 5 performs further compression of the encoded data stored in the memory medium as an image file by one of operation mode 1, operation mode 3, and this operation mode. The processing flow of operation mode 5 is shown by FIG. 12. Operation mode 5 is used when there is little unused space in the memory medium, and when further compression is required for a specific use of the image file.

At Step S2041, the image file specified by the user input unit 1010 is read from the memory medium (1025A, 1025B, or the external storage device).

At Step S2042, the control unit 1015 sets up the memory domain management unit (sector size) corresponding to the memory medium to the encoded data processing unit 1005.

At Step S2043, the encoded data of the read image file are decoded and expanded to image data by the image expanding unit 1012, and the image data are displayed on a display unit 1013.

At Step S2044, the user input unit 1010 provides a discarding direction. At this time, a method for code discarding is specified. When none is specified, the control unit 1015 automatically determines a code discarding method. As described above, code discarding of the encoded data according to JPEG 2000 can be performed in various units, and specifying the code discarding method referred to here is specifying, "in what units code discarding is to be performed."

At Step S2045, the encoded data processing unit 1005 performs code discarding of the encoded data according to the specified code discarding method, or, lacking thereof, as determined by the control unit 1015. The amount of the codes to be discarded is selected as an integer multiple of the memory domain management unit (sector size). Accordingly, the image file size of the encoded data after code discarding becomes near, but does not exceed, an integer multiple of the memory domain management unit (sector size). The image expanding unit 1012 expands the encoded data after code discarding, the image data are obtained, and the image data are displayed on the display unit 1013 (Step S2043).

Steps S2043 through S2045 are repeated until the user input unit 1010 provides an ending direction. When the ending direction is provided by the user input unit 1010 (YES at Step S2046), the process continues to Step S2047.

At Step S2047, the encoded data, the amount of which is cut down by the process as described above, are stored in the memory medium as an image file. As stated above, since the image file size after code discarding of the encoded data becomes near, but does not exceed, an integer multiple of memory domain management units (sector size), there is little waste of the memory domain, and efficient utilization of the memory medium is enhanced.

As described above, this operation mode uses the encoded data processing unit 1005 to adjust the file size of the encoded data.

In addition, in the case of a moving picture, the same process is performed as in the case of the encoded data of the still image for each frame.

From the explanations above, it is clear that an embodiment, such as follows, is available, and is included in the scope of the present invention. Namely, in the embodiment, code discarding is automatically performed such that the size of the image file become equal to or smaller (by the smallest possible amount) than the greatest integer multiple of the memory domain management unit (sector size), which is obtained by specifying a target image file size, and calculating the greatest integer multiple of the memory domain management unit (sector size) that does not exceed the target file size. Here, a variation of the embodiment is possible, which is included in the scope of the present invention, wherein a process for specifying priority ranks of code discarding units in advance is performed; code discarding is performed in the code discarding units based on the ranks; and when compression does not achieve the target file size in a higher ranking code discarding unit, the next lower code discarding unit is used.

<<Operation Mode 6>>

Figure 13:
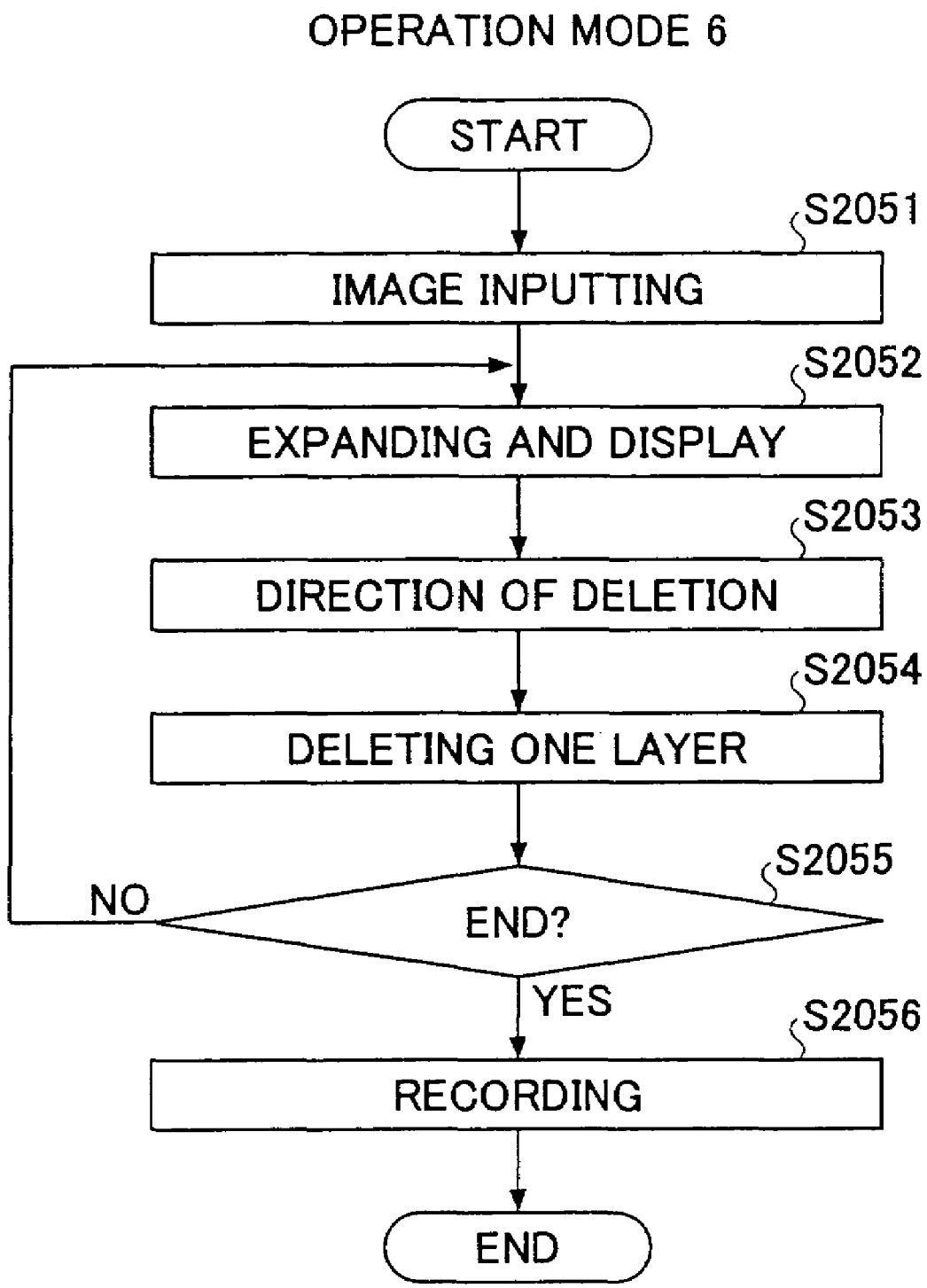
FIG. 13 is a flowchart illustrating operation mode 6.

Operation mode 6 performs further compression of the encoded data stored as an image file in the memory medium by one of operation mode 2, operation mode 4, this operation mode, and operation mode 7 (described below). The processing flow of operation mode 6 is shown by FIG. 13. Operation mode 6 is used when there is little unused space in the memory medium, and when further compression is required for use of the image file.

At Step S2051, the image file specified by the user input unit 1010 is read from the memory medium (1025A, 1025B, or the external storage device).

At Step S2052, the encoded data of the read image file are decoded and expanded by the image expanding unit 1012, and the obtained image data are displayed on the display unit 1013.

At Step S2053, the user input unit 1010 provides a discarding direction.

At Step S2054, the encoded data processing unit 1005 discards codes of the last layer of the encoded data. It is evident that the file size of the encoded data after code discarding becomes near the integer multiple of the memory domain management unit (sector size), but does not exceed the integer multiple value, as long as codes of a layer that is lower than the above-mentioned layer i are discarded.

The header information of the encoded data and the like are updated as needed. The encoded data after code discarding are expanded by the image expanding unit 1012, and the expanded image data are displayed on the display unit 1013 (Step S2052).

Steps S2052-S2054 are repeated until the user input unit 1010 provides an ending direction. When the ending direction is input by the user input unit 1010 (YES at Step S2055), the process continues to Step S2056.

At Step S2056, the encoded data, the amount of which is cut down by the processing as described above is stored in the original memory medium as an image file. Since the file size does not exceed an integer multiple of the memory domain management unit (sector size), but comes close to the value of the integer multiple value as stated above, there is little waste of the memory domain, and efficient utilization of the memory medium is enhanced.

As described above, this operation mode uses the encoded data processing unit 1005 adjusts the file size of the encoded data.

In addition, in the case of a moving picture, the same process is performed as in the case of the encoded data of the still image for each frame.

<Operation Mode 7>>

Figure 14:
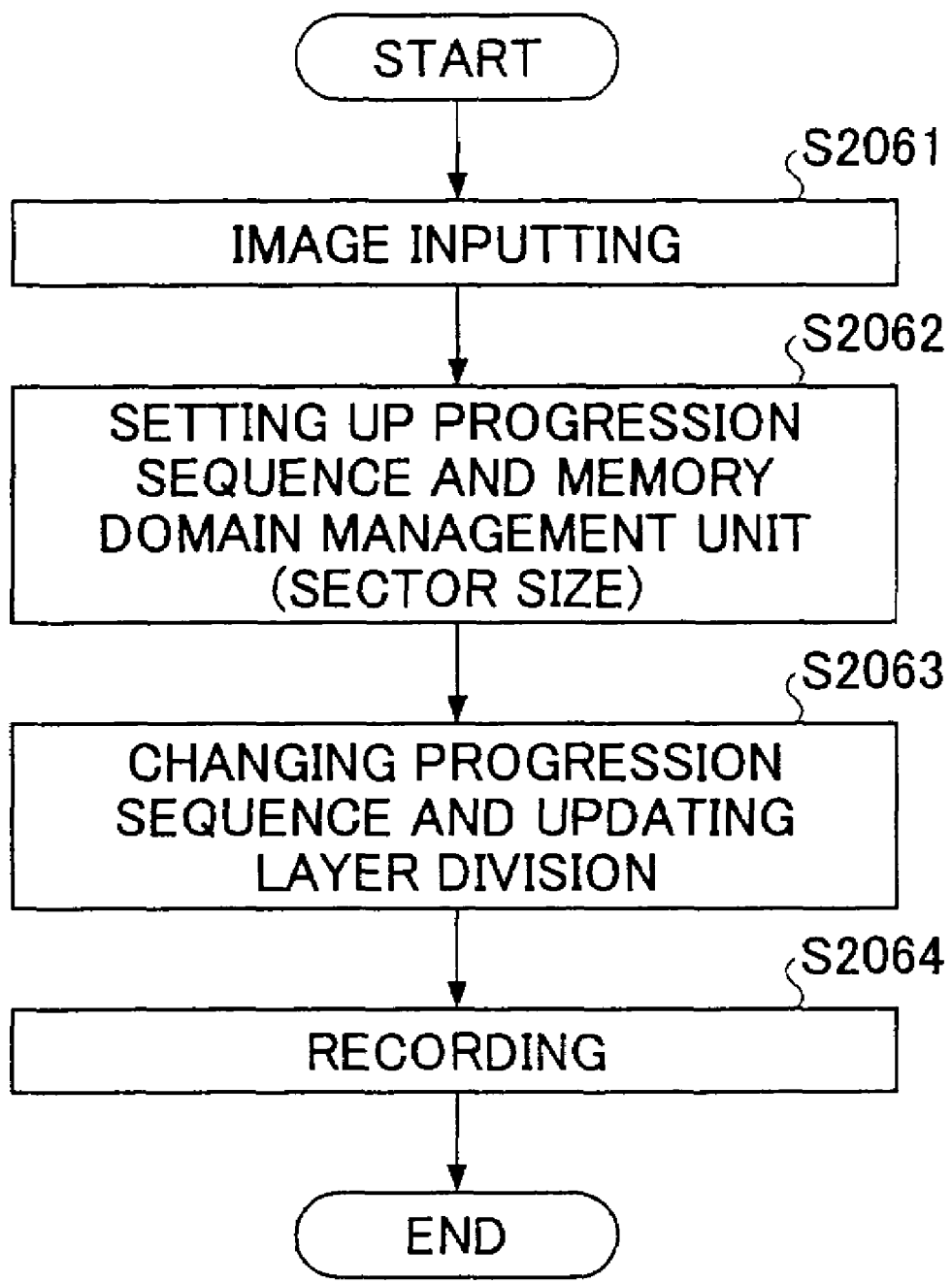
FIG. 14 is a flowchart illustrating operation mode 7.

Operation mode 7 changes the progression sequence and restructures the layer division of the multi-layer structured encoded data that are stored in the memory medium as an image file by one of operation modes 2, 4, 6, and this operation mode. The processing flow of operation mode 7 is shown by FIG. 14.

In JPEG 2000, the progression sequence is defined by five elements, namely, LRCP, RLCP, RPCL, PCRL, and CPRL, wherein L represents a layer, R represents a resolution, C represents a component, and P represents a precinct (position).

In the case of a LRCP progression sequence, packets are arranged (when encoding) and the packets are interpreted (when decoding) in the order as expressed by a "for" loop, where L, R, C, and P are nested in this sequence as follows.

```
for (layer) {
  for(resolution level) {
    for(component) {
      for(precinct) {
        packets arranged: when encoding
          packets interpreted: when decoding
        }
      }
    }
  }
}
```

An example is shown by FIG. 15 where 36 packets, in the case that the image size is set at 100×100 pixels (with no tile division), the number of layers is set at 2, the number of resolution levels is set at 3 (i.e., levels 0 through 2), the number of components is set at 3, and the size of the precinct is set at 32×32, are arranged and interpreted by order as shown.

In the case of a RLCP progression sequence, packet arrangement (when encoding) and packet interpretation (when decoding) are performed according to a "for" loop as follows.

```
for(resolution level) {
  for(layer) {
    for(component) {
      for(precinct) {
        packets arranged: when encoding
        packets interpreted: when decoding
        }
      }
    }
  }
}
```

In the cases of other progression sequences, the sequence of packet arrangement (when encoding) and packet interpretation (when decoding) are determined by a similar nested "for" loop.

As described above, packets contained in each layer are changed when the progression sequence of the encoded data is changed. Accordingly, the layer division has to be updated. This operation mode is for performing changes of the progression sequence and updating the layer division of the encoded data in consideration of the memory domain management unit (sector size). Explanations follow with reference to FIG. 14.

At Step S2061, the image file specified by the user input unit 1010 is read from the memory medium (1025A, 1025B, or the external storage device).

At Step S2062, the control unit 1015 sets up the progression sequence as specified by the user input unit 1010, and the memory domain management unit (sector size) corresponding to the memory medium (1025A, 1025B, or the external storage device) of the storing destination to the encoded data processing unit 1005. It is also possible for the user input unit 1010 to specify a desired memory domain management unit (sector size), in which case, the memory domain management unit (sector size) specified is set up. The purpose of allowing the user input unit 1010 to specify the memory domain management unit (sector size) is as previously explained in relation to operation mode 1.

At Step S2063, the encoded data processing unit 1005 generates newly encoded data according to the specified progression sequence from the read encoded data of an image file, and then, layer division (including file size adjustment of the encoded data) is performed and updated. In the layer division process, the size of a layer is adjusted so that the total size of each layer boundary after the specified or default layer i (i>=0) plus file header size do not exceed the integer multiple value of the set-up memory domain unit, and the difference between the integer multiple value and the total layer size+file header size becomes as small as possible, as in the process explained in relation to Step S2013 of FIG. 8. The processing method of the last layer is the same as that of Step S2013. In addition, the header information of the encoded data and the like is updated as required.

At Step S2064, the new encoded data generated in the manner described above are stored in the memory medium of the storing destination as an image file. Since file size adjustment of the encoded data is performed as stated above, there is very little waste of the memory domain. Further, even if code discarding in a layer unit is performed afterwards, there is very little waste of the memory domain. In addition, where the codes of the last layer are later discarded when the above-described method (1) is applied to the last layer, the waste of the memory domain decreases significantly.

As described above, this operation mode uses the encoded data processing unit 1005 to adjust the file size of the encoded data.

In addition, in the case of a moving picture, the same process is performed as in the case of the encoded data of the still image for each frame.

<<Operation Mode 8>>

Operation mode 8 is for dividing the encoded data of the multi-layer structure, which are stored as an image file in the memory medium by operation modes 2, 4, 6, 7, etc., into two groups of encoded data in layer units, where each group is stored in a different memory medium. For example, the first group of data includes one or a few higher ranked layers and is stored in a high-speed memory medium for purposes such as image search; and the second group of data is stored in a large capacity memory medium of relatively lower speed. The processing flow of operation mode 8 is shown by FIG. 16.

At Step S2071, the image file specified by the user input unit 1010 is read from the memory medium.

At Step S2072, the control unit 1015 sets up to the encoded data processing unit 1005 the memory domain management unit (sector size) of the memory medium to be used as the storing destination of the first group of the encoded data, and the memory domain management unit (sector size) of the memory medium to be used as the storing destination of the second group of the encoded data. These memory media can be set as defaults, or can be specified by the user input unit 1010.

At Step S2073, the encoded data processing unit 1005 performs layer restructuring, taking the memory domain management unit (sector size) into consideration, which is of the memory medium for storing the first group of the encoded data according to the same procedure as the case of operation mode 2 above. The first group of the encoded data is generated by deleting the remaining codes. Here, if the memory domain management unit (sector size) is the same as the memory domain management unit (sector size) applied to the original encoded data, restructuring of the first group, representing the higher ranking layers, is unnecessary.

At Step S2074, the first group of the encoded data, generated as above, is stored in the memory medium of the storing destination as an image file. This file size does not exceed the integer multiple of the memory domain management unit (sector size), and since it is close thereto; there is very little waste of the memory domain.

At Step S2075, the encoded data processing unit 1005 generates the second group of the encoded data that consists of the remainder of the encoded data, representing the lower ranking layers, by discarding codes as in Step S2073. Layer restructuring of the encoded data using the process of operation mode 2 is performed, taking into consideration the memory domain management unit (sector size) relative to the storing destination of the lower ranking layers. The process that is the same as Step S2013 is performed on the last layer. If the memory domain management unit is the same as the memory domain management unit (sector size) applied to the original encoded data, reconstruction of the lower ranking layers is unnecessary.

At Step S2076, the second group of the encoded data, generated as above, is stored to the storing destination memory medium as an image file. Since this file size is close to but does not exceed the integer multiple of the memory domain management unit (sector size), there is very little waste of the memory domain.

In this manner, operation mode 8 uses the encoded data processing unit 1005 to adjust the file size of encoded data.

This operation mode is useful for the purpose of searching for an image by decoding the encoded data of the higher ranking layers stored in the high-speed memory medium, and reproducing a full high definition image by decoding the encoded data of the lower ranking layers, if desired, and adding the lower ranking image data to the image data corresponding to the higher ranking layers.

An operation mode, wherein a set of encoded data is divided into three or more groups of encoded data in layer units is also possible, and such an operation mode is included in the present invention.

It is also possible to realize the functions and the processes of each operation mode as described above of the image-processing apparatus of the present invention by software and by a microcomputer built into a general-purpose computer such as a personal computer, a special purpose computer, and other apparatuses. The present invention includes a program, and various kinds of memory (recording) media that store the program. Further, although the present invention is suitably applicable to encoded data according to JPEG 2000 and Motion-JPEG 2000, the present invention is also applicable to encoded data in a format in which the same file size adjustment processing in the code state or the same file size adjustment processing in the code generation process is possible.

As explained above, according to one or more embodiments of the present invention, (1) all or almost all of the region of the memory domain assigned to an image file is effectively used, and efficient utilization of the memory medium is improved since the file size of the encoded data is adjusted in consideration of the memory domain management unit (sector size), (2) in the case of multi-layer structure encoded data, since size of layers lower than a specified layer is made close to but not exceeding an integer multiple of the memory domain management unit (sector size), the memory medium can be effectively used, even if code discarding in a layer unit of the lower ranking layers is performed later, (3) the layer structure and file size may be optimized by restructuring the layers when file size adjustment of the encoded data is performed, when saving the multi-layer data in another memory medium where the storage management domain unit differs, (4) changing a progression sequence is possible simultaneously with file size adjustment of the encoded data, (5) image search is facilitated by dividing the encoded data into two or more layer groups of encoded data, such that only the encoded data belonging to, for example, a higher rank layer or layers are stored on a high-speed memory medium, when performing file size adjustment of the encoded data, (6) a code discarding method for file size adjustment of the encoded data is selectable such that a method adequate for the intended use of the encoded data and the like can be selected, (7) a memory domain management unit (sector size) can be specified as desired, such that file size adjustment of the encoded data suitable for another memory medium is performed in the case, for example, that copying or transmitting the encoded data to another medium is envisaged, and the like.

Further, the present invention is not limited to these embodiments, but various variations and modifications may be made without departing from the scope of the present invention.

The present application is based on Japanese priority application No. 2002-244530 filed on Aug. 26, 2002 with the Japanese Patent Office, the entire contents of which are hereby incorporated by reference.

What is claimed is:

1. An image-processing apparatus that stores encoded data of an image as a file in a memory medium in the image-processing apparatus, or externally, comprising:
a unit to adjust file size of the image data based on a memory domain management unit of the memory medium such that the file size becomes near, but does not exceed an integer multiple of the memory domain management unit of the memory medium,
wherein size of the memory domain management unit is equal to size of a sector of the memory medium.

2. The image-processing apparatus as claimed in claim 1, wherein the unit for adjusting the file size processes the encoded data in a state of encoded codes as they are.

3. The image-processing apparatus as claimed in claim 1, further comprising an image compression unit to carry out compression coding of the image and for generating the encoded data.

4. The image-processing apparatus as claimed in claim 1, wherein a method for code discarding for the file size adjustment is selectable.

5. The image-processing apparatus as claimed in claim 1, wherein the encoded data consist of a plurality of layers, and each layer is restructured when the file size adjustment is carried out.

6. The image-processing apparatus as claimed in claim 1, wherein the encoded data consist of a plurality of layers, and when the file size adjustment is carried out, the file size of a lower ranking layer is adjusted to be near an integer multiple of the memory domain management unit, the lower ranking layer being ranked lower than a predetermined specific layer.

7. The image-processing apparatus as claimed in claim 1, wherein the encoded data consist of a plurality of layers, and when the file size adjustment is carried out, a sequence of progression is changed and the layer division is revised.

8. The image-processing apparatus as claimed in claim 1, wherein the encoded data are divided into a plurality of sets of encoded data on a layer basis, when the file size adjustment is carried out.

9. The image-processing apparatus as claimed in claim 1, wherein the memory domain management unit for the file size adjustment is set up as desired.

10. An image-processing method of storing encoded data of an image as a file in a memory medium, the method comprising:
adjusting, by an image processing apparatus, file size based on a memory domain management unit of the memory medium such that the file size becomes near, but does not exceed an integer multiple of the memory domain management unit of the memory medium,
wherein size of the memory domain management unit is equal to size of a sector of the memory medium.

11. The image-processing method as claimed in claim 10, wherein the file size adjustment of the encoded data is performed by processing the encoded data in a state of encoded codes as they are.

12. The image-processing method as claimed in claim 10, further comprising performing a compression coding process to carry out the file size adjustment of the encoded data while generating the encoded data.

13. The image-processing method as claimed in claim 10, further comprising selecting a method of code discarding for the size adjustment of the encoded data.

14. The image-processing method as claimed in claim 10, wherein the encoded data consist of a plurality of layers, and each layer is restructured when the file size adjustment is carried out.

15. The image-processing method as claimed in claim 10, wherein the encoded data consist of a plurality of layers, and when the file size adjustment is carried out, the file size of a lower ranking layer is adjusted to be near an integer multiple of the memory domain management unit, the lower ranking layer being ranked lower than a predetermined specific layer.

16. The image-processing method as claimed in claim 10, wherein a sequence of progression is changed and the layer division is revised, when the file size adjustment is carried out.

17. The image-processing method as claimed in claim 10, wherein the encoded data are divided into a plurality of sets of encoded data on a layer basis, when the file size adjustment is carried out.

18. The image-processing method as claimed in claim 10, wherein the memory domain management unit for the file size adjustment is set up as desired.

19. An article of manufacture having one or more recordable media storing instructions thereon which, when executed by a system, cause the system to encode data by:
adjusting file size based on a memory domain management unit of the memory medium such that the file size becomes near, but does not exceed an integer multiple of the memory domain management unit of the memory medium,
wherein size of the memory domain management unit is equal to size of a sector of the memory medium.

20. The article of manufacture defined in claim 19, wherein the file size adjustment of the encoded data is performed by processing the encoded data in a state of encoded codes as they are.

21. The article of manufacture defined in claim 19, wherein the system further encodes data by performing in a compression coding process to carry out the file size adjustment of the encoded data while generating the encoded data.

22. The article of manufacture defined in claim 19, wherein the system further encodes data by selecting a method of code discarding for the size adjustment of the encoded data.

23. The article of manufacture defined in claim 19, wherein the encoded data consist of a plurality of layers, and each layer is restructured when the file size adjustment is carried out.

24. The article of manufacture defined in claim 19, wherein the encoded data consist of a plurality of layers, and when the file size adjustment is carried out, the file size of a lower ranking layer is adjusted to be near an integer multiple of the memory domain management unit, the lower ranking layer being ranked lower than a predetermined specific layer.

25. The article of manufacture defined in claim 19, wherein a sequence of progression is changed and the layer division is revised, when the file size adjustment is carried out.

26. The article of manufacture defined in claim 19, wherein the encoded data are divided into a plurality of sets of encoded data on a layer basis, when the file size adjustment is carried out.

27. The article of manufacture defined in claim 19, wherein the memory domain management unit for the file size adjustment is set up as desired.

* * * * *